US011153168B1

(12) United States Patent
Dhamal Gopalarathnam et al.

(10) Patent No.: US 11,153,168 B1
(45) Date of Patent: Oct. 19, 2021

(54) LINK VALIDATION SYSTEM

(71) Applicant: Dell Products L.P., Round Rock, TX (US)

(72) Inventors: Sudharsan Dhamal Gopalarathnam, Redmond, WA (US); Vamshidhar Varre, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/198,886

(22) Filed: Mar. 11, 2021

(51) Int. Cl.
*G06F 15/173* (2006.01)
*H04L 12/24* (2006.01)

(52) U.S. Cl.
CPC .......... *H04L 41/0869* (2013.01); *H04L 41/12* (2013.01)

(58) Field of Classification Search
CPC .............................. H04L 41/0869; H04L 41/12
See application file for complete search history.

(56) References Cited

U.S. PATENT DOCUMENTS 8,625,596 B1 * 1/2014 Thomas .............. H04L 41/0876
370/392

* cited by examiner

*Primary Examiner* — Wing F Chan
*Assistant Examiner* — Joseph R Maniwang
(74) *Attorney, Agent, or Firm* — Joseph Mencher

(57) ABSTRACT

A link validation system includes a first device and a second device. The first device identifies that a first link to the second device has become available via a first port on the first device, and determines that the first link to the second device is not a valid link. In response to determining that the first link to the second device is not a valid link, the first device configures the first port in an auto-negotiation error state. Subsequent to configuring the first port in the auto-negotiation error state, the first device detects a port connection cycling operation associated with the first port and, in response, clears the auto-negotiation error state for the first port.

20 Claims, 15 Drawing Sheets

LINK VALIDATION SYSTEM

BACKGROUND

The present disclosure relates generally to information handling systems, and more particularly to validating links provided between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, server devices, storage systems, and/or other computing devices known in the art, often have their ports connected to each other via cables in order to provide "links" between those computing devices according to a predefined link topology. In such systems, it is desirable to perform link validation in order to prevent links from being provided between the computing devices in a manner that is not defined by the predefined link topology, as doing so can result in data loops and/or other negative network effects. Conventional link validation systems (e.g., "inbuild" link validation tools that are included within network operating systems, link validation tools that are decoupled from network operating systems, etc.) operate to validate data identified in Link Layer Discovery Protocol (LLDP) communications against a predefined link topology map to determine whether a link over which the LLDP communication was received is connected to ports on computing devices as defined by the predefined link topology map. However, conventional link validation systems suffer from a number of issues.

For example, many conventional link validation systems will operate to simply log a link that is determined to be invalid based on the predefined link topology map, but will not operate to take any preventative actions on that link, which can result in data communications being transmitted over that link and the possibility of the negative network effects discussed above. Furthermore, conventional link validation systems that perform preventative actions suffer from issues as well. For example, some conventional link validation systems have been integrated with the Border Gateway Protocol (BGP), and operate to prevent BGP neighbors from being formed over a link that is invalid based on the predefined link topology map. However, such conventional link validation systems will not handle non-BGP situations, and may not prevent the sending of data communications over the link that is invalid based on the predefined link topology, particularly if one of the computing devices connected via that link is a host that doesn't utilize the BGP. Other conventional link validation systems operate to disable a port connected to a link that is invalid based on the predefined link topology map by configuring that port as "administratively down" and leaving that port in an error/disabled state, which operates to prevent data communications from being transmitted through that port via the link. However, the configuration of ports as "administratively down" and in the error/disabled state by conventional link validation systems remains even once a user has provided the correct link to that port, and requires the user to manually reconfigure the port as "administratively up" in order to allow that port to be used again.

Accordingly, it would be desirable to provide a link validation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a link validation engine that is configured to: identify that a first link to a device has become available via a first port coupled to the processing system; determine that the first link to the device is not a valid link; configure, in response to determining that the first link to the device is not a valid link, the first port in an auto-negotiation error state; detect, subsequent to configuring the first port in the auto-negotiation error state, a port connection cycling operation associated with the first port; and clear, in response to detecting the port connection cycling operation associated with the first port, the auto-negotiation error state for the first port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
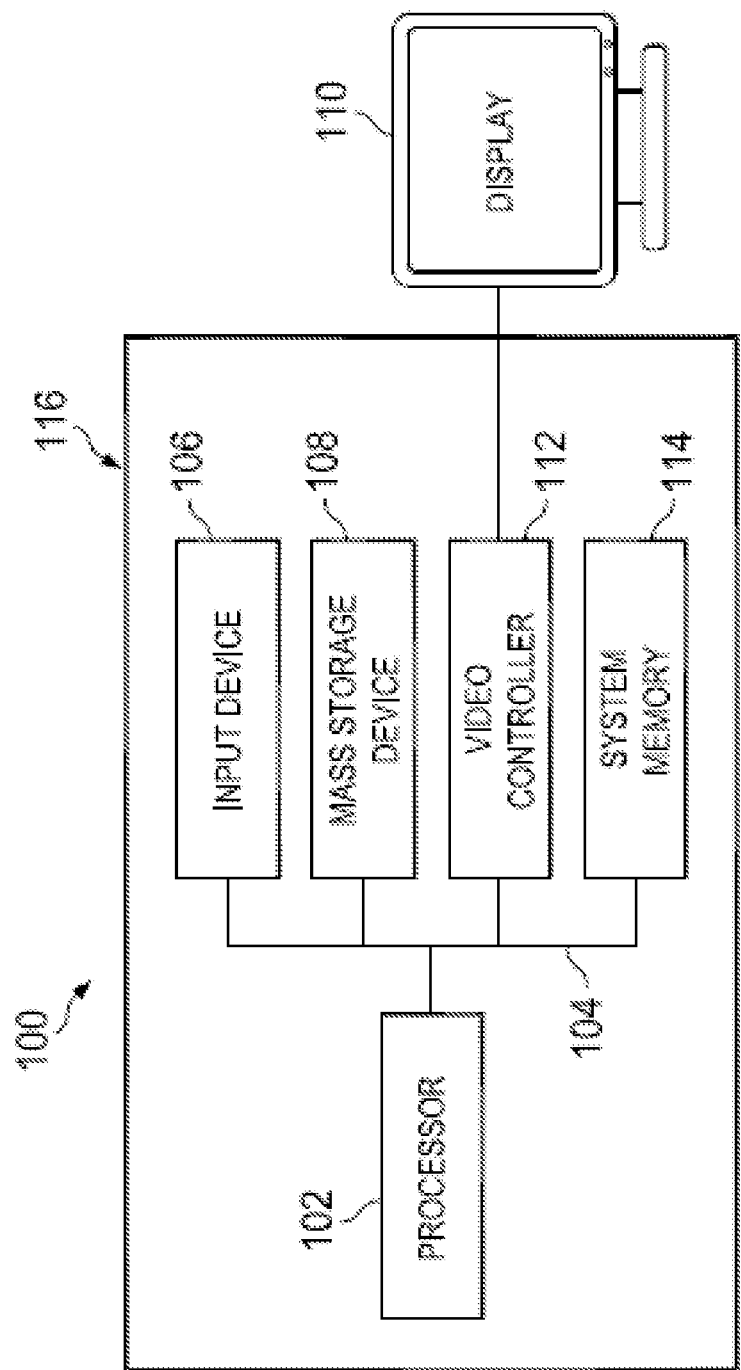
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
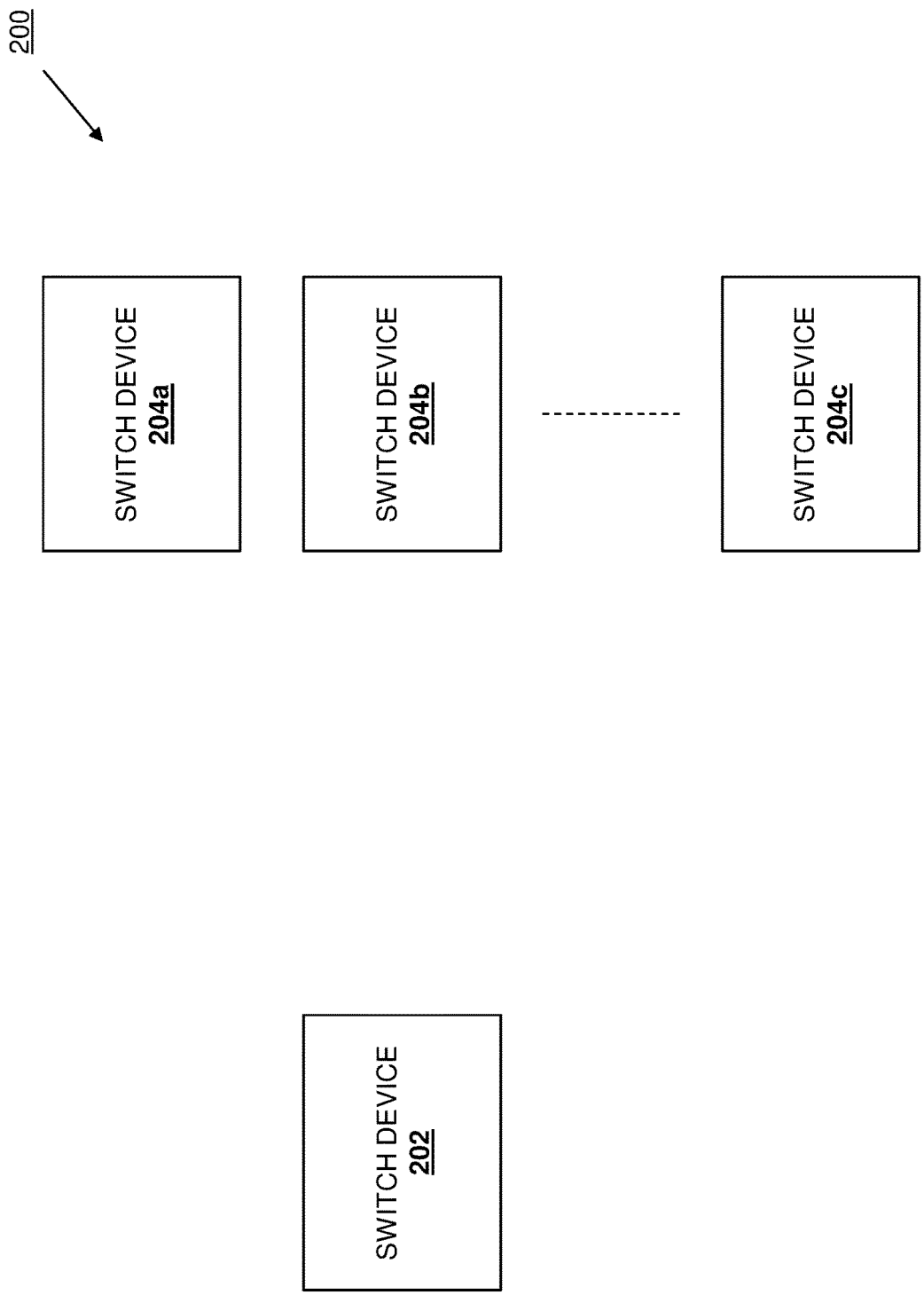
FIG. 2 is a schematic view illustrating an embodiment of a networked system that may utilize the link validation system of the present disclosure.

Referring now to FIG. 2, an embodiment of a networked system 200 is illustrated that may utilize the link validation system of the present disclosure. In the illustrated embodiment, the networked system 200 includes a switch device 202 that may be coupled to plurality of other switch devices 204a, 204b, and up to 204c via, for example, the connection of a cable to ports on those switch devices. In an embodiment, any of the switch devices 202, 204a, 204b, and up to 204c may be provided by the IHS 100 discussed above with reference to FIG. 1, and/or may include some or all of the components of the IHS 100. However, while the link topology validation system of the present disclosure is described below as validating links provided between switch devices, one of skill in the art in possession of the present disclosure will recognize that the link topology validation system of the present disclosure may be utilized to validate a link between any two devices while remaining within the scope of the present disclosure as well. As such, any or all of the switch devices 202, 204a, 204b, and up to 204c may be replaced by server devices, storage systems, and/or other computing devices while remaining within the scope of the present disclosure as well. Thus, while a specific networked system 200 has been described, one of skill in the art in possession of the present disclosure will appreciate that the link topology validation system of the present disclosure may be provided in a networked system having a variety of components and/or component configurations that will fall within the scope of the present disclosures as well.

Figure 3:
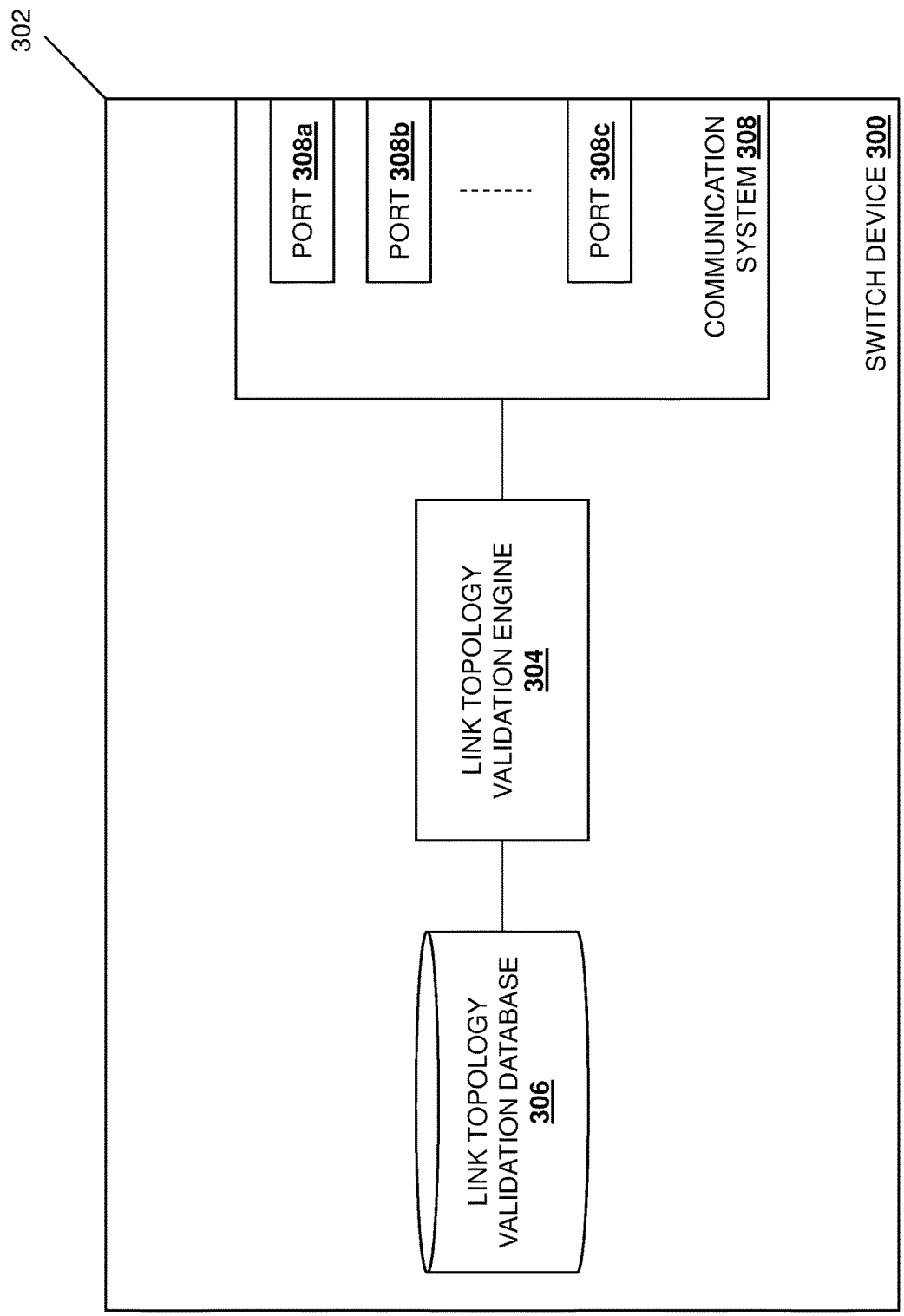
FIG. 3 is a schematic view illustrating an embodiment of a switch device that may be included in the networked system of FIG. 2 and that may provide the link validation system of the present disclosure.

Referring now to FIG. 3, an embodiment of a switch device 300 is illustrated that may provide any or all of the switch devices 202, 204a, 204b, and up to 204c discussed above with reference to FIG. 2. As such, the switch device 300 may be provided by the IHS 100 discussed above, and/or may include one or more components of the IHS 100. However, while illustrated and described below as being provided by a switch device, one of skill in the art in possession of the present disclosure will appreciate that the components, configuration, and/or functionality of the switch device 300 may be provided in server devices, storage systems, and/or other computing devices while remaining within the scope of the present disclosure as well. In the illustrated embodiment, the switch device 300 includes a chassis 302 that houses the components of the switch device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a link topology validation engine 304 that is configured to perform the functionality of the link topology validation engines and switch devices discussed below.

In an embodiment, the chassis 302 may also house a storage system (not illustrated, but which may include the storage device 108 discussed above with reference to FIG. 1) that is coupled to the link topology validation engine 304 (e.g., via a coupling between the storage system and the processing system) and that includes a link topology validation database 306 that is configured to store any of the information utilized by the link topology validation engine 304 as discussed below. In an embodiment, the chassis 302 may also house a communication system 308 that may be provided by a Network Interface Controller (NIC), wireless communication systems (e.g., Near Field Communication (NFC) systems, BLUETOOTH® communication systems, WiFi communications systems, and/or other wireless communication systems known in the art), and/or any other communication components known in the art. As illustrated in FIG. 3, the communication system 308 may include ports 308a, 308b, and up to 308c, which as discussed below may operate to provide the links that are validated by the link topology validation engine 304 as discussed above. However, while a specific switch device 300 has been illustrated and described, one of skill in the art in possession of the present disclosure will appreciate that switch devices may include other components and/or component configurations for performing conventional switch device functionality, as well as the functionality described below, while remaining within the scope of the present disclosure as well.

Figure 4:
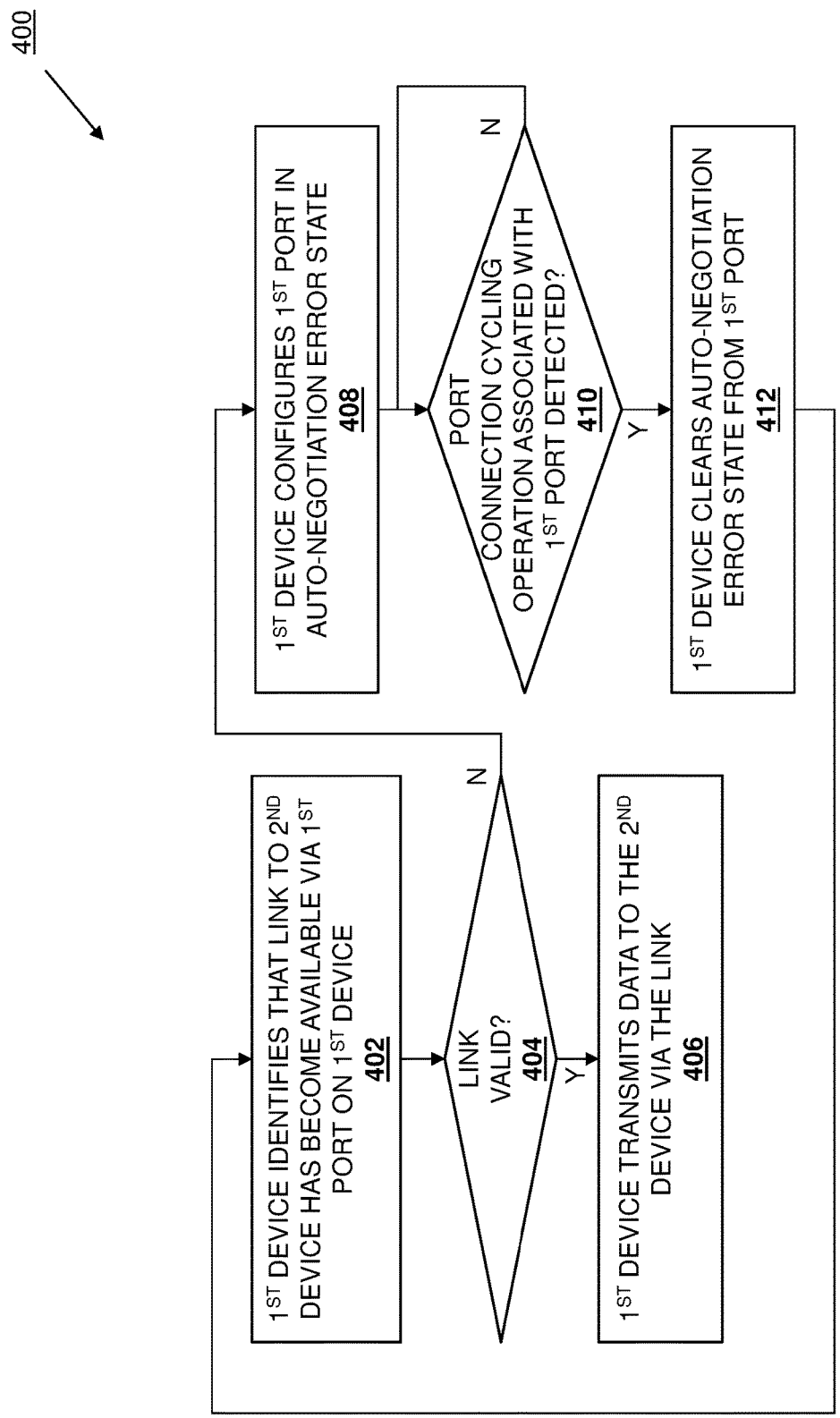
FIG. 4 is a flow chart illustrating an embodiment of a method for validating a link.

Referring now to FIG. 4, an embodiment of a method 400 for validating a link is illustrated. As discussed below, the systems and methods of the present disclosure provide for the configuration of a port that provides an invalid link in an auto-negotiation error state that provides that port in an operationally down state that still allows connection signals to be detected via that port, which further allows the auto-negotiation error state to be automatically cleared from that port in response to detecting a port connection cycling operation associated with that port such that subsequent link validation operations may again be performed on a link provided via that port without the need to manually reconfigure that port. For example, the link validation system of the present disclosure may include a first device and a second device. The first device identifies that a first link to the second device has become available via a first port on the first device, and determines that the first link to the second device is not a valid link. In response to determining that the first link to the second device is not a valid link, the first device configures the first port in an auto-negotiation error state. Subsequent to configuring the first port in the auto-negotiation error state, the first device detects a port connection cycling operation associated with the first port and, in response, clears the auto-negotiation error state for the first port. As such, the link validation systems and methods of the present disclosure handle invalid links by stopping the flow of data traffic over the link, and allowing link validation operations to be automatically reinitiated when the connection on either end of the link is changed, thus remedying issues associated with conventional link validation systems.

Figure 5A:
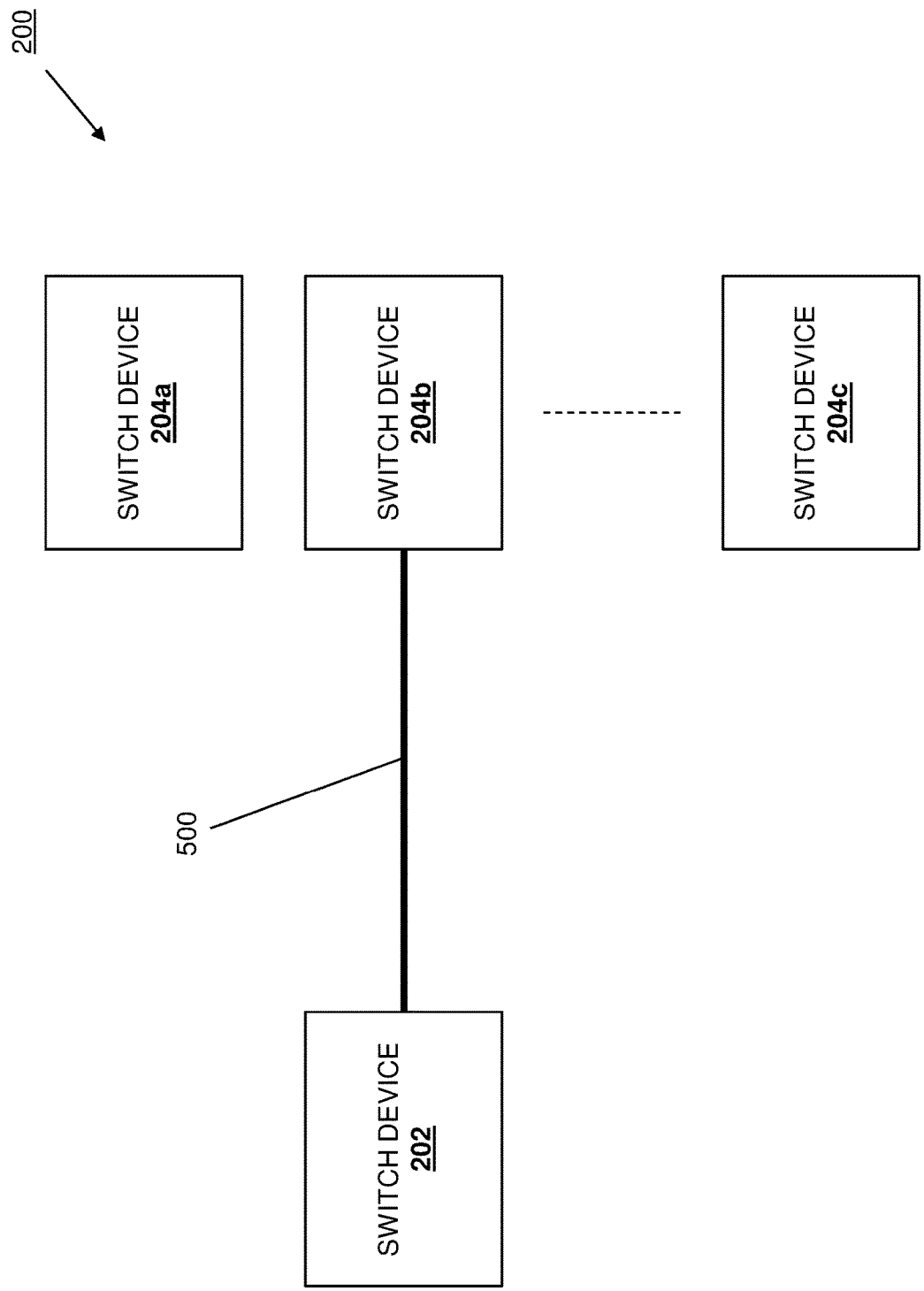
FIG. 5A is an embodiment of the networked system of FIG. 2 operating during the method of FIG. 4.
Figure 5B:
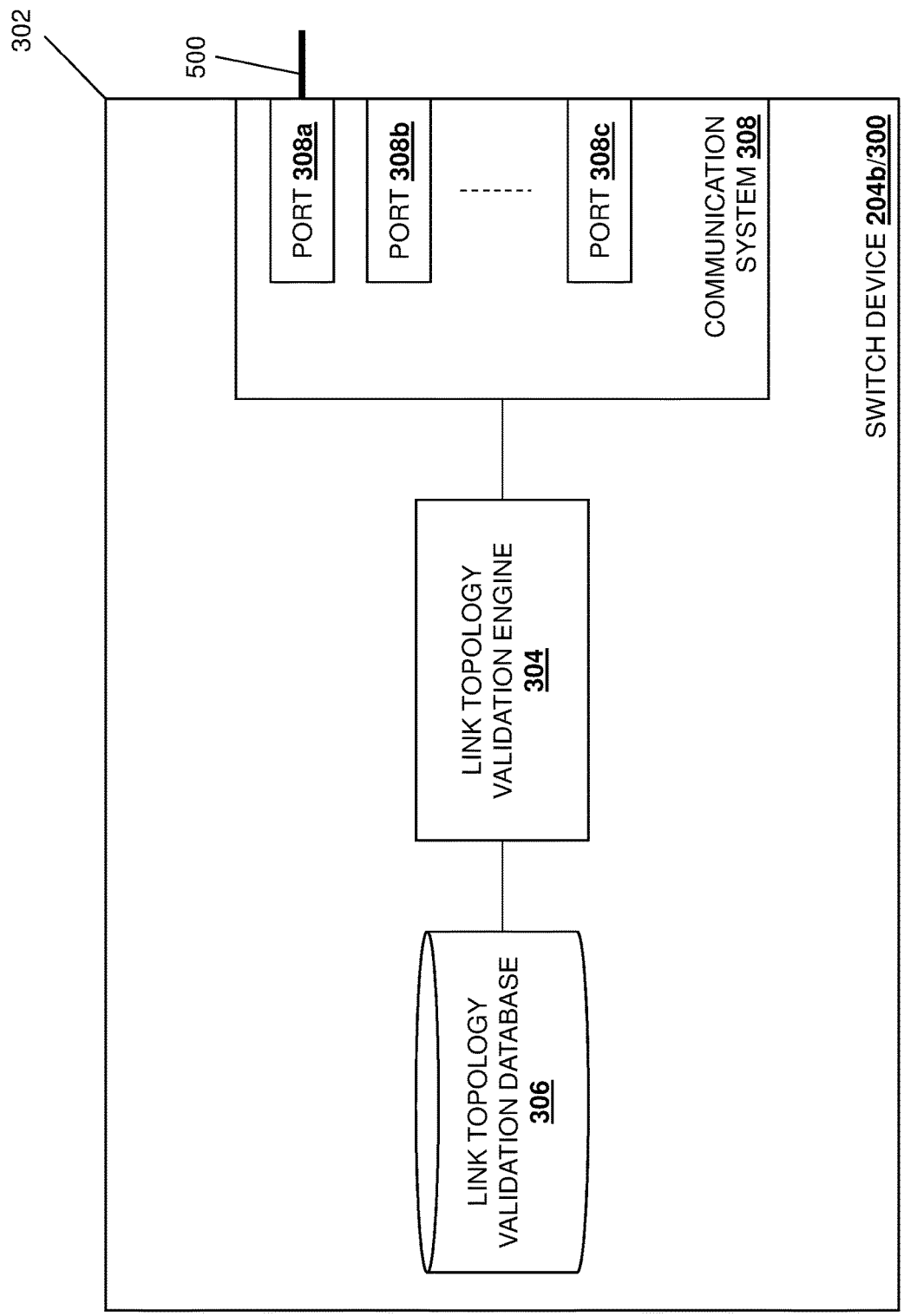
FIG. 5B is an embodiment of the switch device of FIG. 3 operating during the method of FIG. 4.
Figure 5C:
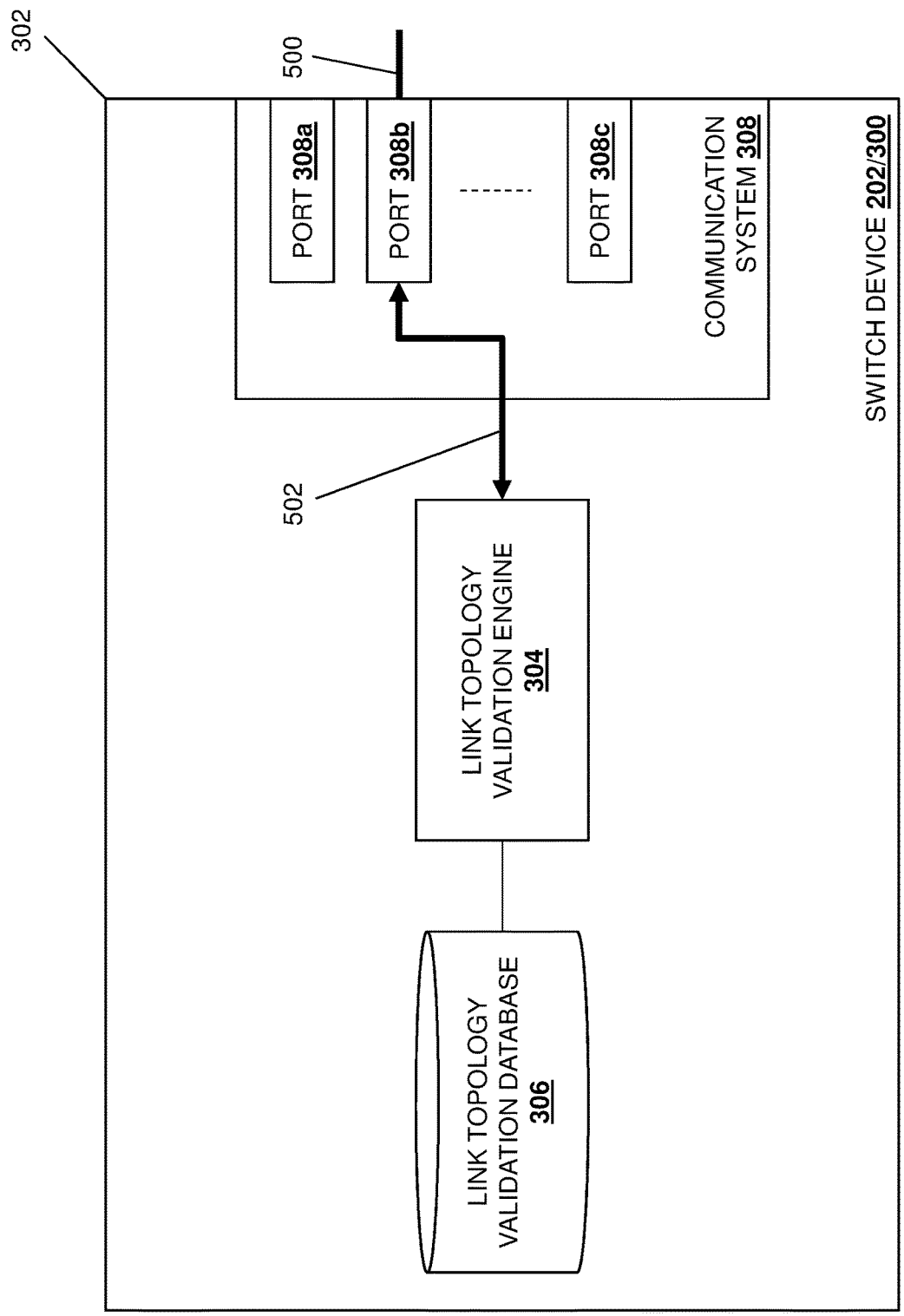
FIG. 5C is an embodiment of the switch device of FIG. 3 operating during the method of FIG. 4.

The method 400 begins at block 402 where a first device identifies that a link to a second device has become available via a first port on the first device. With reference to FIGS. 5A, 5B, and 5C, in an embodiment of block 402, a link 500 may be provided between the switch device 202 and the switch device 204b. In a specific example, the link 500 may be provided by connecting a transceiver device to the port 308a on the switch device 204b/300 (as illustrated in FIG. 5B), connecting a transceiver device to the port 308b on the switch device 202/300 (as illustrated in FIG. 5C), and connecting cable connectors on opposite ends of a cable to the transceiver devices. However, while a specific example is illustrated and described, one of skill in the art in possession of the present disclosure will appreciate that a link may be provided between devices in a variety of manners that will fall within the scope of the present disclosure, and thus any ports on any devices may be connected by a cable to provide the link identified at block 402 while remaining within the scope of the present disclosure. Furthermore, while a single link 500 is illustrated and described in FIG. 5A, one of skill in the art in possession of the present disclosure will appreciate how many more links may (and typically will) be provided between the switch devices 202 and 204a-204c (and/or other devices in the networked system 200) and validated according to the method 400 while remaining within the scope of the present disclosure as well.

As will be appreciated by one of skill in the art in possession of the present disclosure, the connection of the port 308a on the switch device 204b/300 and the port 308b on the switch device 202/300 (e.g., via the cable and transceiver devices discussed above, and/or via other connection techniques known in the art) may be followed by the port 308a on the switch device 204b/300 and the port 308b on the switch device 202/300 performing any of a variety of conventional port auto-negotiation operations known in the art in order to establish the link 500. As such, the switch device 202, the switch device 204b, the port 308a on the switch device 204b/300, the port 308b on the switch device 202/300, and/or any other link establishment subsystems (e.g., serializer/deserializer subsystems) in the ports and/or the switch devices 202 and 204b may operate to perform and complete auto-negotiation operations in order to establish the link 500 prior to that link being identifiable at block 402. In an embodiment, the establishment of the link 500 such that it become identifiable at block 402 may include the port 308b on the switch device 202/300 entering an operationally up state (e.g., in the event the port properties (e.g., port speed, etc.) of the port 308b on the switch device 202/300 and the port 308a on the switch device 204b/300 match).

In an embodiment, at block 402, the link topology validation engine 304 in the switch device 202/300 may perform link identification operations 502 via its port 308b in order to identify the link 500 provided between that port 308b and the port 308a on the switch device 204b/300. For example, at block 402 the link topology validation engine 304 in the switch device 202b/300 may receive a Link Layer Discovery Protocol (LLDP) communications via its port 308b, and may utilize information in that LLDP communication (as well as any other information available to the link topology validation engine 304 in the switch device 202/300) to identify the switch device 204b, the port 308a on switch device 204b/300 that provides the link 500, the port 308b on the switch device 202/300 that provides the link 500, and/or other information that one of skill in the art in possession of the present disclosure will recognize as allowing for the link validation operations discussed below.

The method 400 then proceeds to decision block 404 where it is determined whether the link is valid. In an embodiment, during or prior to the method 400, a predefined link topology map may be stored in the link topology validation database 306, and one of skill in the art in possession of the present disclosure will appreciate how the predefined link topology map may identify how each of the switch devices 202 and 204a-204c should be connected together in order to provide links in the networked system 200. However, while the predefined link topology map is described as being stored in the link topology validation database 306, one of skill in the art in possession of the present disclosure will appreciate that the predefined link topology map may be stored in other locations that are accessible to the link topology validation engine 304 while remaining within the scope of the present disclosure as well. As such, the predefined link topology map may define how the ports on the switch devices 202 and 204a-204c should be connected together (e.g., via the cabling and transceiver devices discussed above, or other connection techniques known in the art), and thus may include any link topology information that one of skill in the art in possession of the present disclosure would recognize as allowing the link topology validation engine 304 to validate an identified link.

Figure 6:
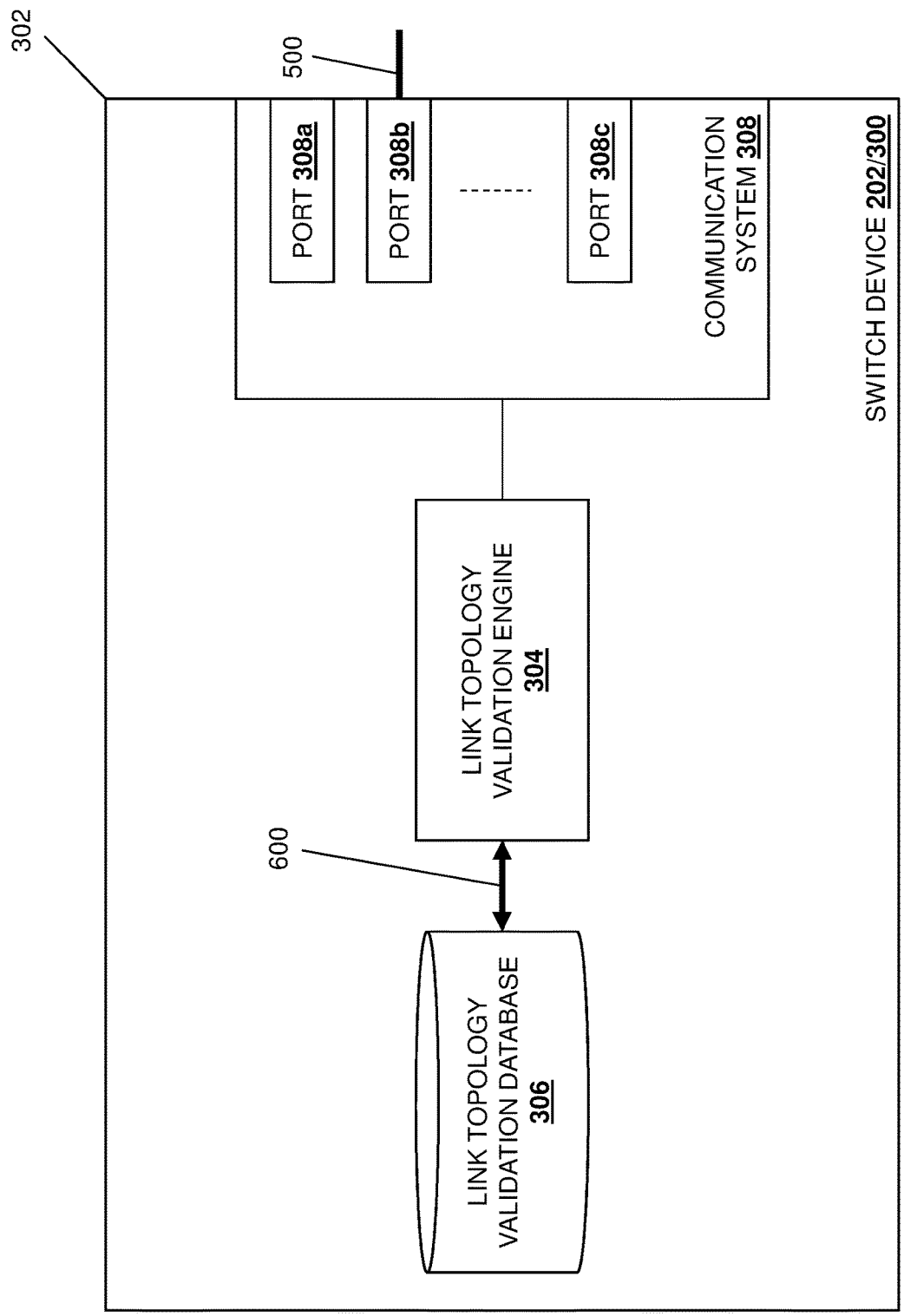
FIG. 6 is an embodiment of the switch device of FIG. 3 operating during the method of FIG. 4.

With reference to FIG. 6, in an embodiment of decision block 404, the link topology validation engine 304 may perform link validation operations 600 that include comparing the information about the link 500 that was identified at block 402 to the information included in the predefined link topology map stored in the link topology validation database 306 in order to determine whether the link 500 is a valid link (i.e., a link that is defined by the predefined link topology map). For example, continuing with the specific example provided above, the link validation operations 600 that include comparing the port 308b on the switch device 202/300 and the port 308a on the switch device 204b/300 that provide the link 500 that was identified at block 402 to the valid links identified in the predefined link topology map stored in the link topology validation database 306 in order to determine whether the link 500 is a valid link defined by the predefined link topology map (i.e., whether the predefined link topology map defines a valid link that connects the port 308b on the switch device 202/300 and the port 308a on the switch device 204b/300). However, while specific link validation operations have been described, one of skill in the art in possession of the present disclosure will appreciate that other link validation operations may be performed while remaining within the scope of the present disclosure as well.

If, at decision block 404, it is determined that the link is valid, the method 400 proceeds to block 406 where the first device transmits data to the second device via the link. In an embodiment, at block 406 and in response to determining that the link 500 is a valid link defined in the predefined link topology map, the switch device 202 and the switch device 204b may utilize the link 500 to transmit data. For example, one of skill in the art in possession of the present disclosure will appreciate how switch engines in the switch devices 202 and 204b (e.g., provided by Network Processing Units (NPUs) in the switch devices 202 and 204b) may transmit data via the link 500 and between each other in order to perform a variety of switch functionality known in the art. Thus, when the link identified at block 402 is determined to be a valid link defined by the predefined link topology, that link may be utilized to transmit data between the devices it connects.

Figure 7:
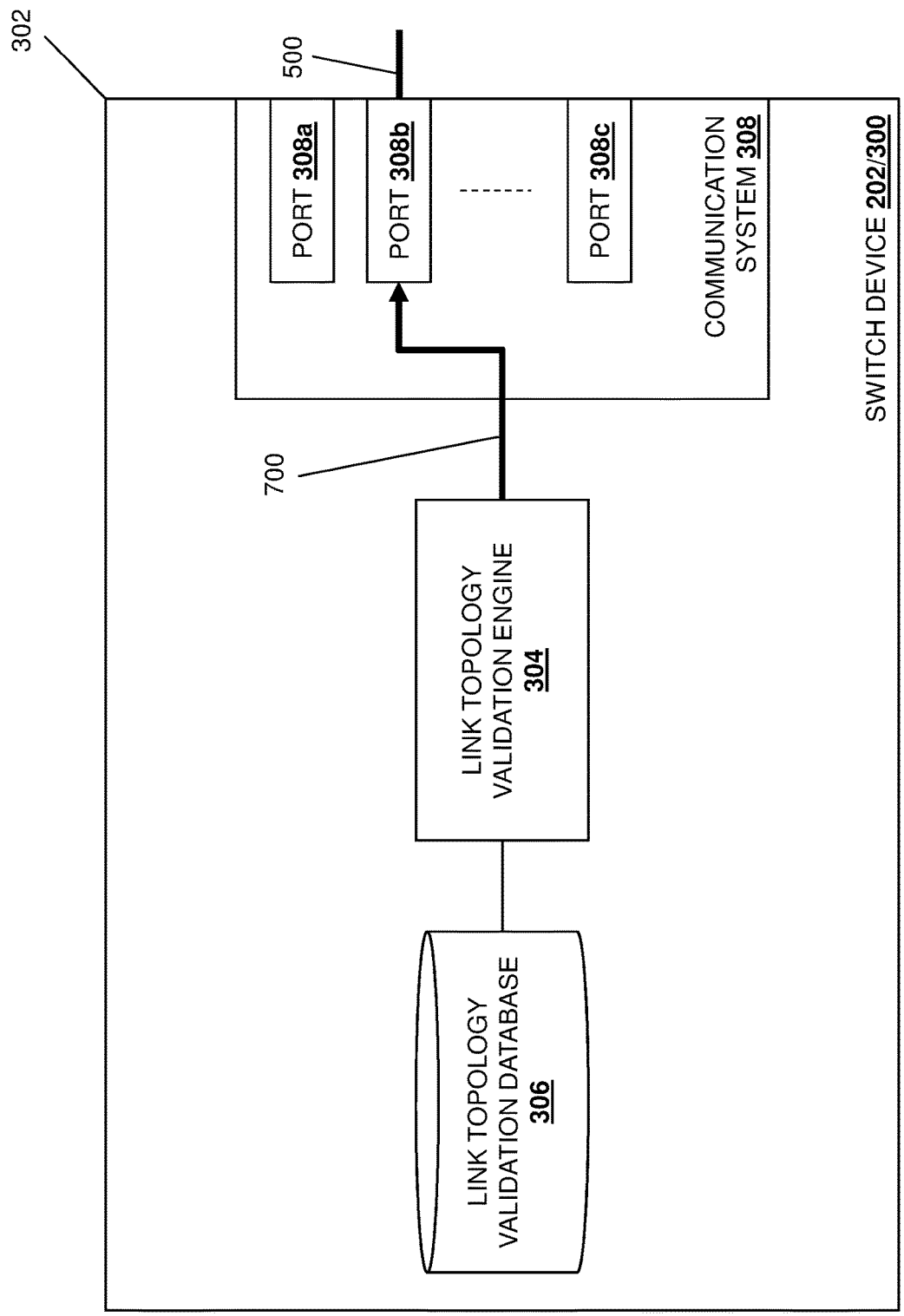
FIG. 7 is an embodiment of the switch device of FIG. 3 operating during the method of FIG. 4.

If, at decision block 404, it is determined that the link is not valid, the method 400 proceeds to block 408 where the first device configures the first port in an auto-negotiation error state. With reference to FIG. 7, in an embodiment of block 408 and in response to determining that the link 500 is not a valid link defined in the predefined link topology map, the link topology validation engine 304 in the switch device 202/300 may perform port configuration operations 700 that include configuring its port 308b, which was determined to be providing the link 500 that is an invalid link according to the predefined link topology map, in an auto-negotiation error state. As will be appreciated by one of skill in the art in possession of the present disclosure, the configuration of the port 308b on the switch device 202/300 in the auto-negotiation error state may provide that port 308b in an operationally down state in which a connection signal remains "up" or otherwise available in a manner that allows the port connection cycling operations discussed below to be detected via that port 308b. As such, the port 308b on the switch device 202/300 may be reconfigured from an operationally up state (which it is in subsequent to the link 500 being established) to an operationally down state (in which a connection signal is available) in the event it is determined to provide an invalid link. One of skill in the art in possession of the present disclosure will appreciate how the configuration of the port 308b on the switch device 202/300 in the operationally down state will prevent data traffic from being transmitted via that port.

As discussed above, the establishment of the link 500 is proceeded by completion of auto-negotiation operations by the switch devices 202 and 204b and/or their ports 308b and 308a, respectively, and thus the auto-negotiation error state in which the port 308b on the switch device 202/300 is configured at block 408 is not part of those auto-negotiation operations. Rather, the inventors of the present disclosure have discovered that the configuration of a port that provides an invalid link in an auto-negotiation error state as part of link validation operations provides benefits over conventional link validation systems by allowing that auto-negotiation error state to be cleared from that port without manual user intervention (e.g., without user commands provided via a Command Link Interface (CLI) on the switch device), discussed in further detail below. For example, as discussed above, conventional link validation systems operate to disable a port connected to an invalid link by configuring that port in an administratively down state that leaves that port in an error/disabled state and prevents data communications from being transmitted through that port via the link, but require the user to manually reconfigure the port as "administratively up" in order to allow that port to be used again. In contrast, the auto-negotiation error state utilized in the link validation system of the present disclosure leaves the port in an operationally down state in which a connection signal is maintained in a manner that allows the port connection cycling operation discussed below to be detected via the port 308b on the switch device 202/300, which allows the auto-negotiation error state to be cleared from that port 308b automatically so that link validation operations may again be performed without the need for the manual user intervention discussed above.

The method 400 then proceeds to decision block 410 where it is determined whether a port connection cycling operation associated with the first port is detected. In an embodiment, at decision block 410, the link topology validation engine 304 in the switch device 202/300 may operate to determine whether a port connection cycling operation associated with its port 308b that was configured in the auto-negotiation error state at block 408 has been detected. As will be appreciated by one of skill in the art in possession of the present disclosure, a port connection cycling operation associated with a first port may occur when 1) a cable connected to the first port and a second port is disconnected from the second port and connected to a third port, or 2) a first cable connected to the first port and a second port is disconnected from the first port, and a second cable connected to a third port is connected to the first port. As will be appreciated by one of skill in the art in possession of the present disclosure, the auto-negotiation error state discussed above that provides a first port operationally down allows a connection signal to remain "up" or otherwise available as along as a cable is connected to the first port and a second port, and thus the port connection cycling operation may be detected by a cable disconnection (e.g., the connection signal going from "up" or available to "down" or unavailable) followed by a cable connection (e.g., the connection signal going from "down" or unavailable to "up" or available).

In the specific examples provided below, a port connection cycling operation is detected for the port 308b on the switch device 202/300 in response to the disconnection of the cable that provides the link 500 from the port 308a on the switch device 204a/300 (e.g., while that cable remains connected to the port 308b on the switch device 202/300), and the connection of that cable to another port on another switch device in order to provide a new link. However, one of skill in the art in possession of the present disclosure will appreciate that a port connection cycling operation may be detected for the port 308b on the switch device 202/300 in response to the disconnection of the cable that provides the link 500 from the port 308b on the switch device 202/300, and the connection of another cable (which is connected to another port on another switch device) to the port 308b on the switch device 202/300 to provide a new link, while remaining within the scope of the present disclosure as well.

If, at decision block 410, it is determined that a port cycling operation associated with the first port has not been detected, the method 400 then returns to decision block 410. As such, the method 400 may loop such that the port 308b on the switch device 202/300 remains configured in the auto-negotiation error state as long as no port connection cycling operation associated with that port 308b is detected. As such, a first port that provide an invalid link will remain in the auto-negotiation error state such that it is operationally down and cannot receive data until either the cable connected to that first port is disconnected from a second port on the other end of that cable and connected to a third port, or a first cable connected to that first port (and connected on its other end to a second port) is disconnected from the first port and a second cable (which is connected on its other end to a third port) is connected to that first port.

Figure 8A:
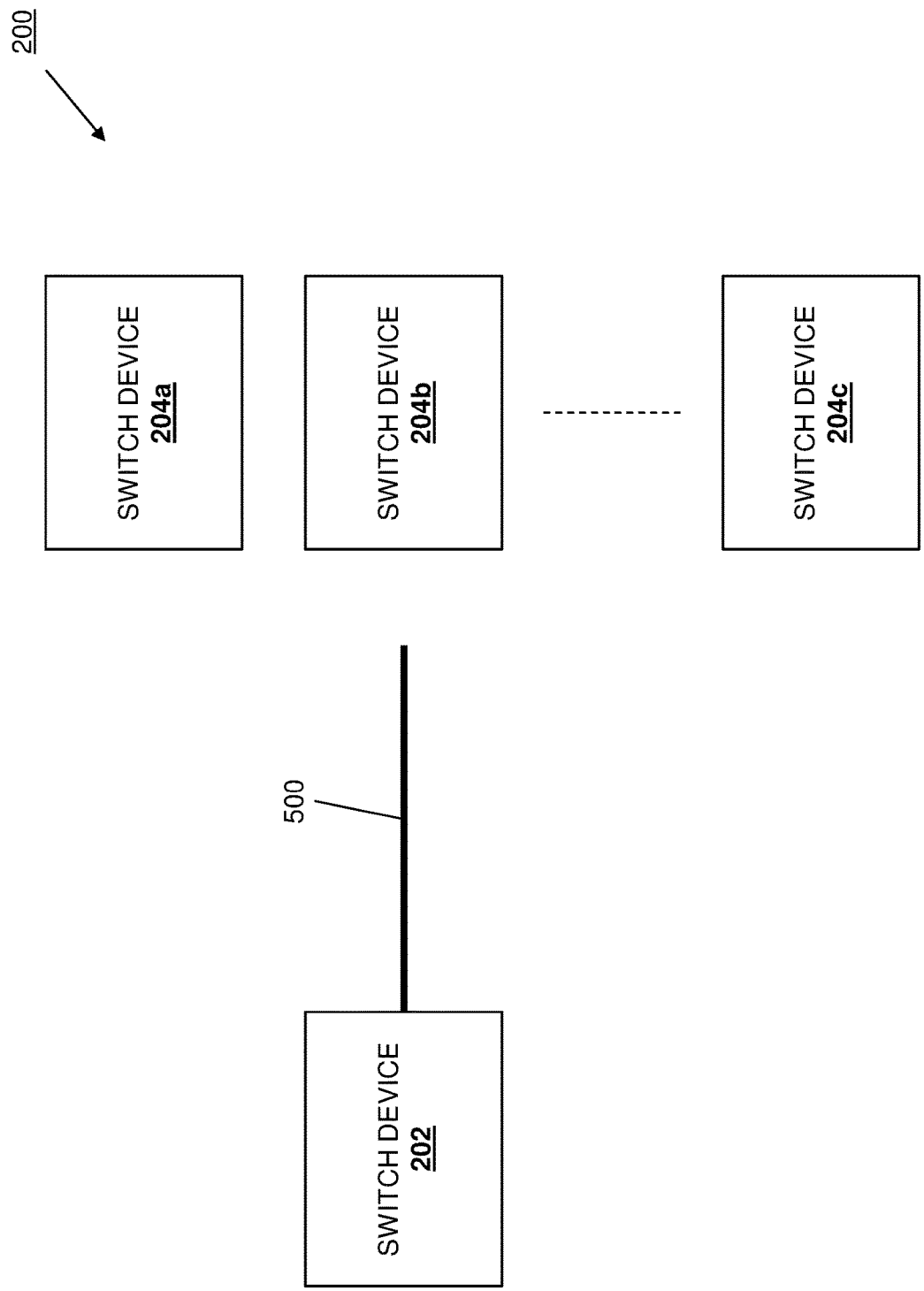
FIG. 8A is an embodiment of the networked system of FIG. 2 operating during the method of FIG. 4.
Figure 8B:
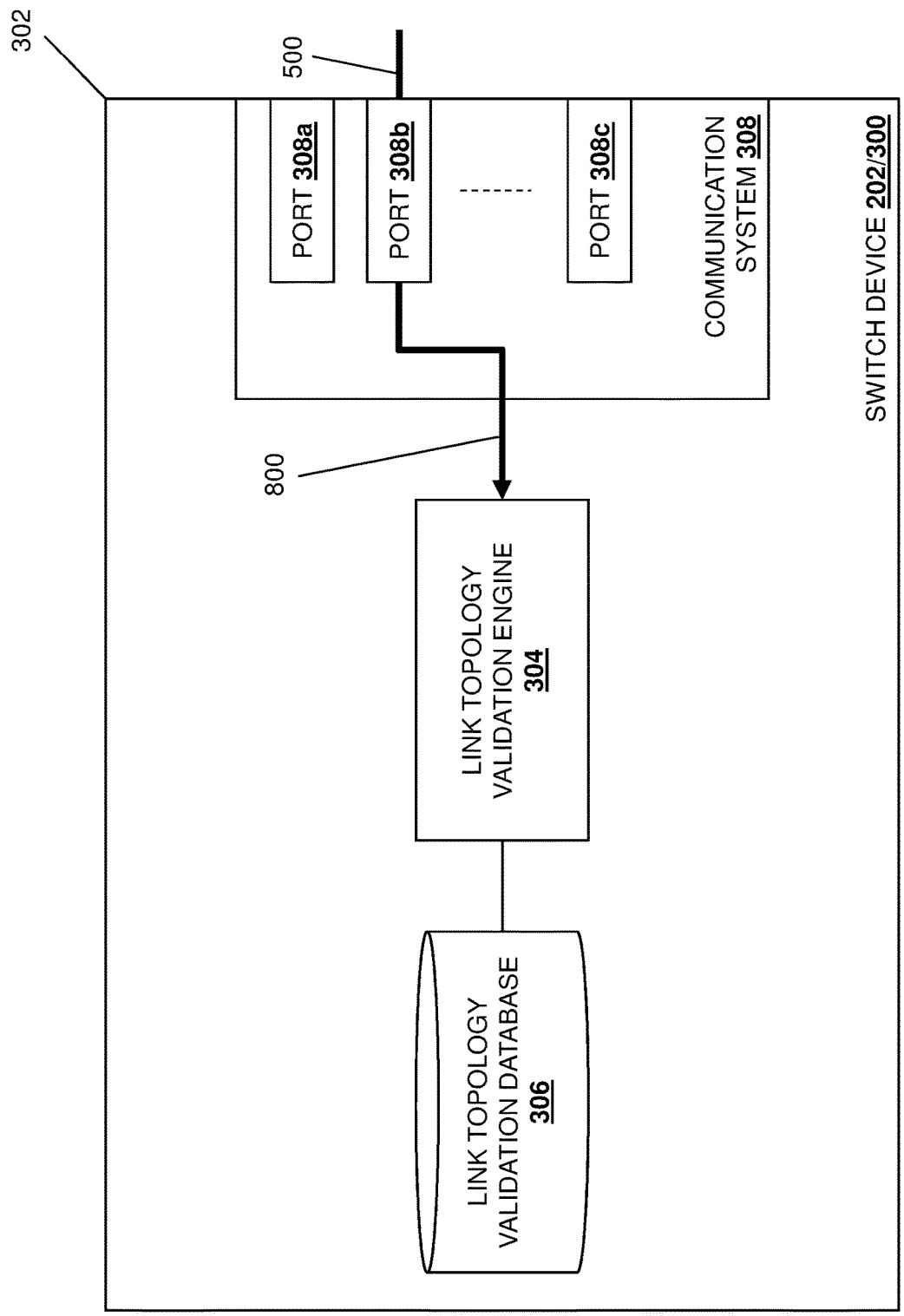
FIG. 8B is an embodiment of the switch device of FIG. 3 operating during the method of FIG. 4.
Figure 9A:
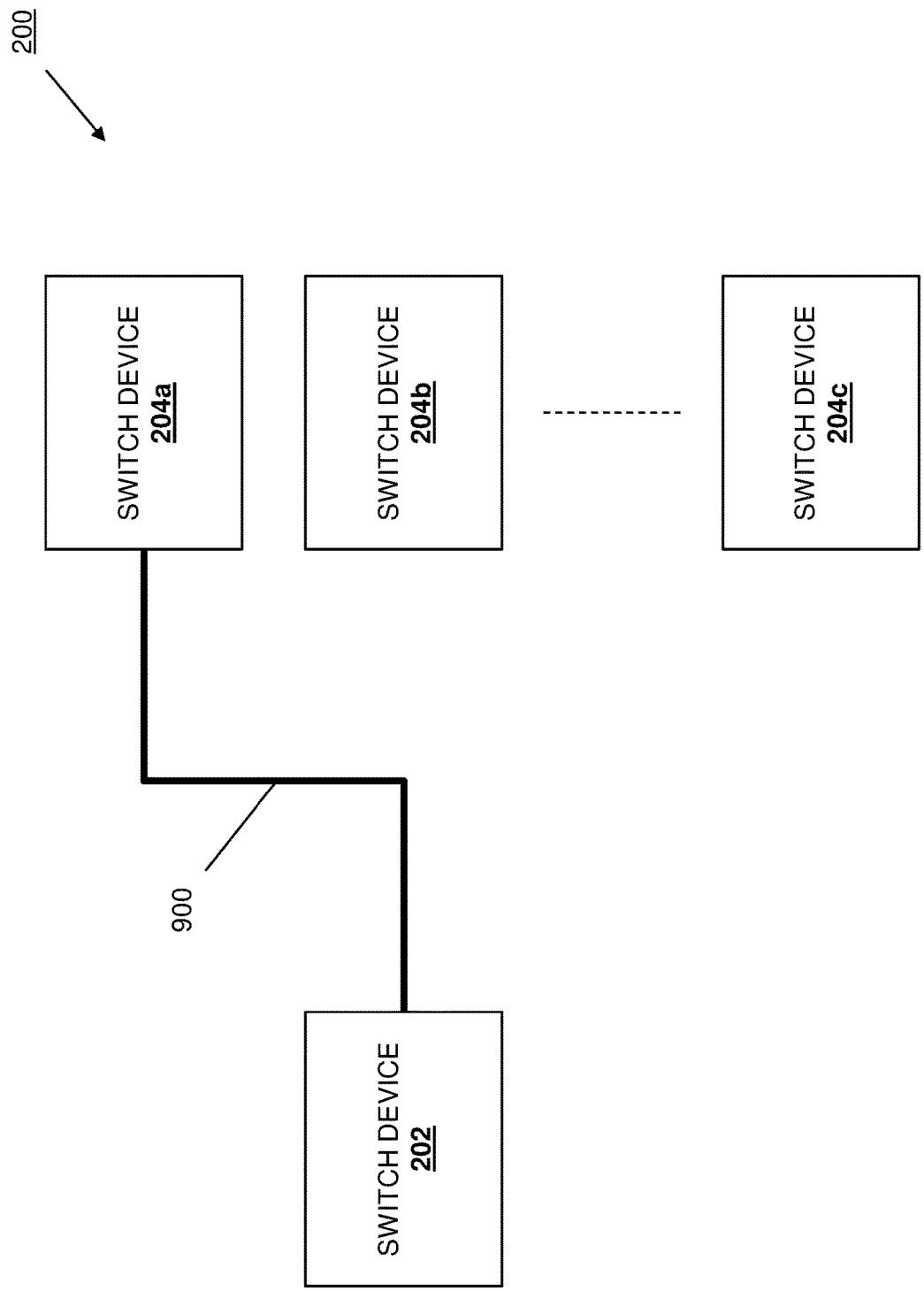
FIG. 9A is an embodiment of the networked system of FIG. 2 operating during the method of FIG. 4.
Figure 9B:
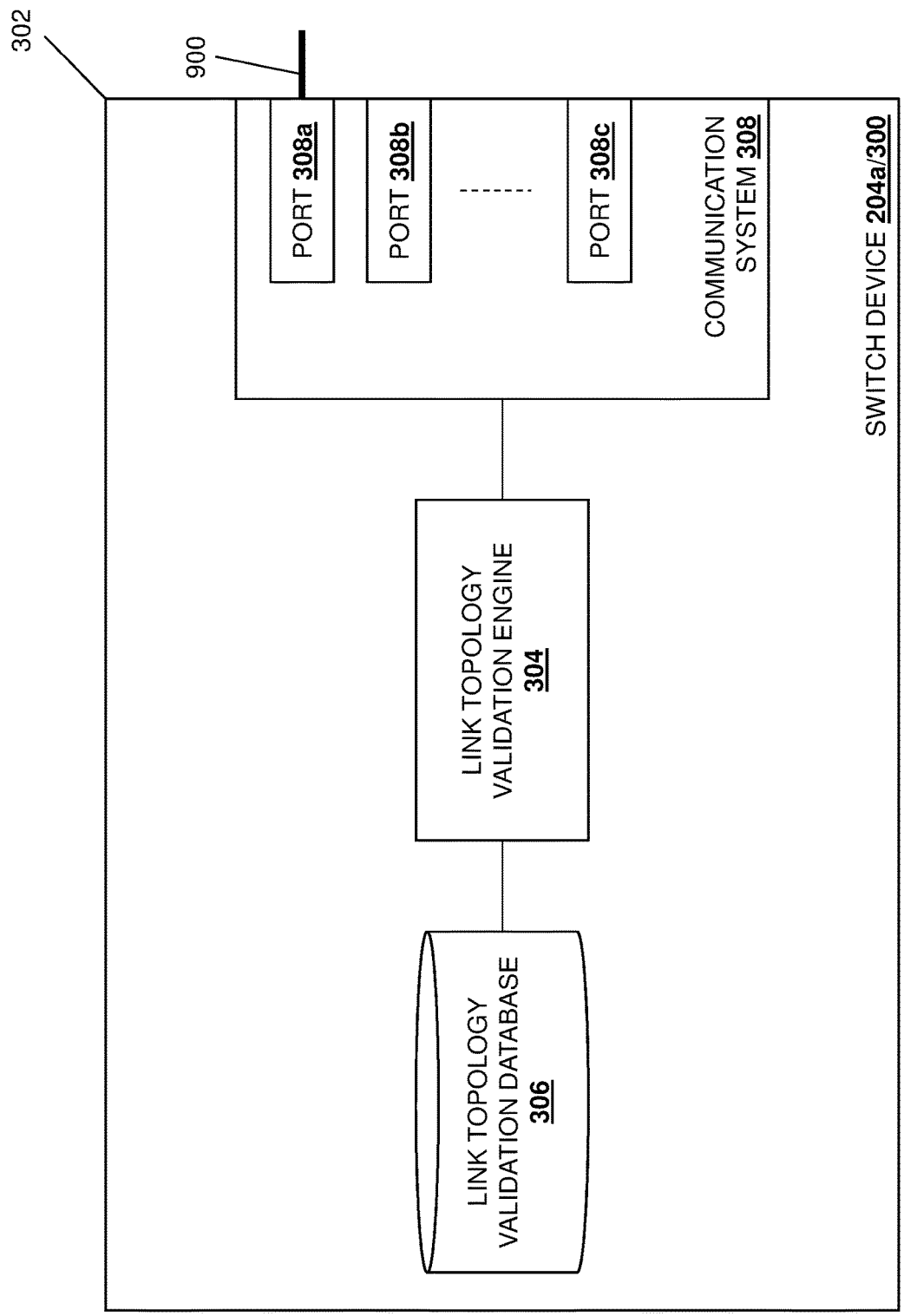
FIG. 9B is an embodiment of the switch device of FIG. 3 operating during the method of FIG. 4.
Figure 9C:
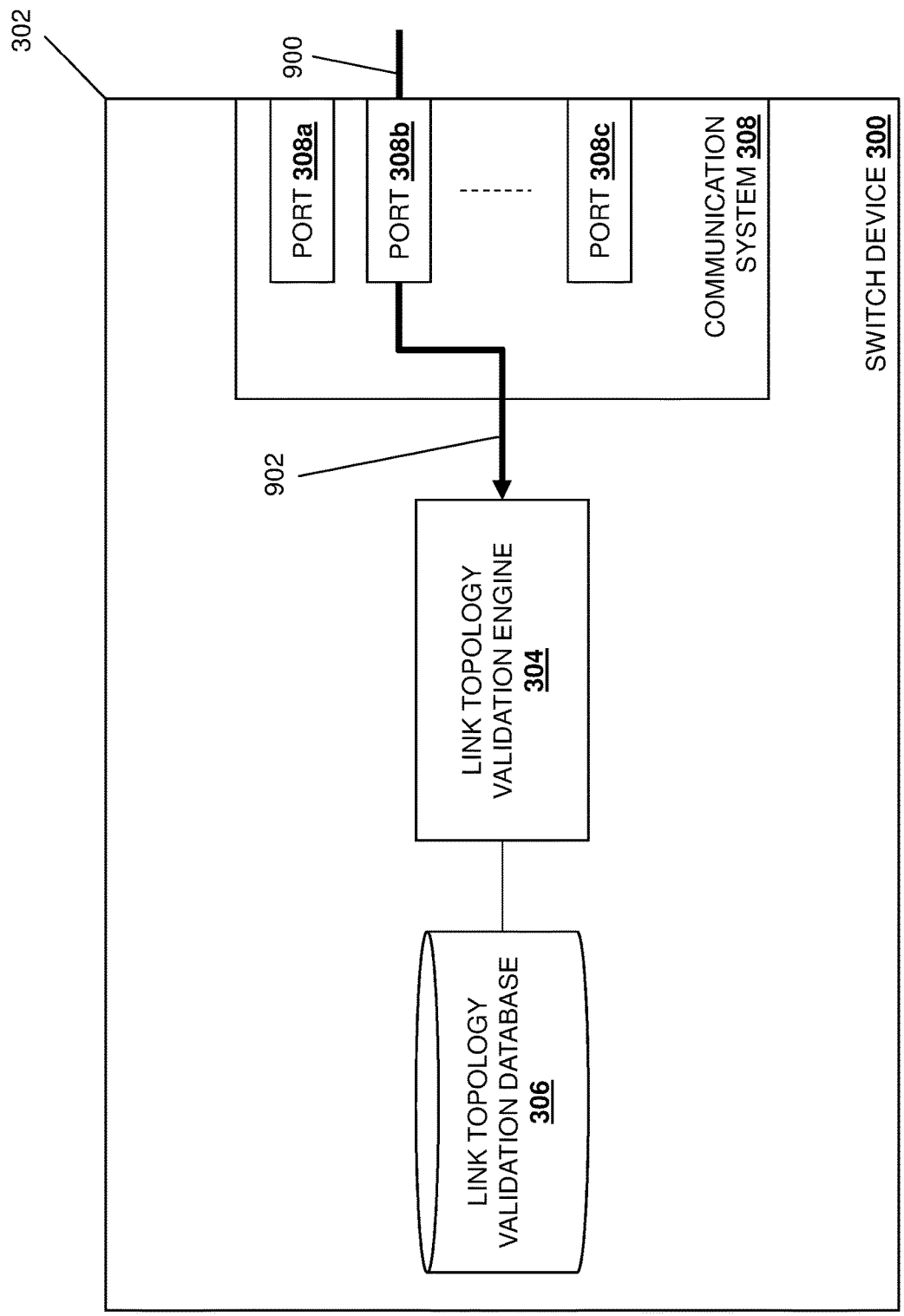
FIG. 9C is an embodiment of the switch device of FIG. 3 operating during the method of FIG. 4.

If, at decision block 410, it is determined that a port connection cycling operation associated with the first port has been detected, the method 400 proceeds to block 412 where the first device clears the auto-negotiation error state from the first port. With reference to FIGS. 8A and 8B, at decision block 410, the cable that provided the link 500 may be disconnected from the port 308a on the switch device 204b/300 (as illustrated in FIG. 8A), which may result in the link topology validation engine 304 in the switch device 202/300 performing connection signal change identification operations 800 that include identifying that the connection signal for its port 308b has changed from "up" or otherwise available to "down" or otherwise unavailable. With reference to FIGS. 9A, 9B, and 9C, at decision block 410, the cable that provided the link 500 may be then be connected to the port 308a on the switch device 204a/300 (as illustrated in FIGS. 9Aa and 9B) in order to provide a link 900, which may result in the link topology validation engine 304 in the switch device 202/300 performing connection signal change identification operations 902 that include identifying that the connection signal for its port 308b has changed from "down" or otherwise unavailable to "up" or otherwise available. As discussed above, the cycling of a connection signal between "up"/available to "down"/unavailable and back to "up"/available provides a port connection cycle that causes the port connection cycling operation to be detected at decision block 410. As will be appreciated by one of skill in the art in possession of the present disclosure, a similar port connection cycling operation may occur if the cable that connects the port 308b on the switch device 202/300 and the port 308a on the switch device 204b/300 is disconnected from the port 308b on the switch device 202/300, and a cable connected to the port 308a on the switch device 204a/300 is connected to the port 308b on the switch device 202/300.

Figure 10:
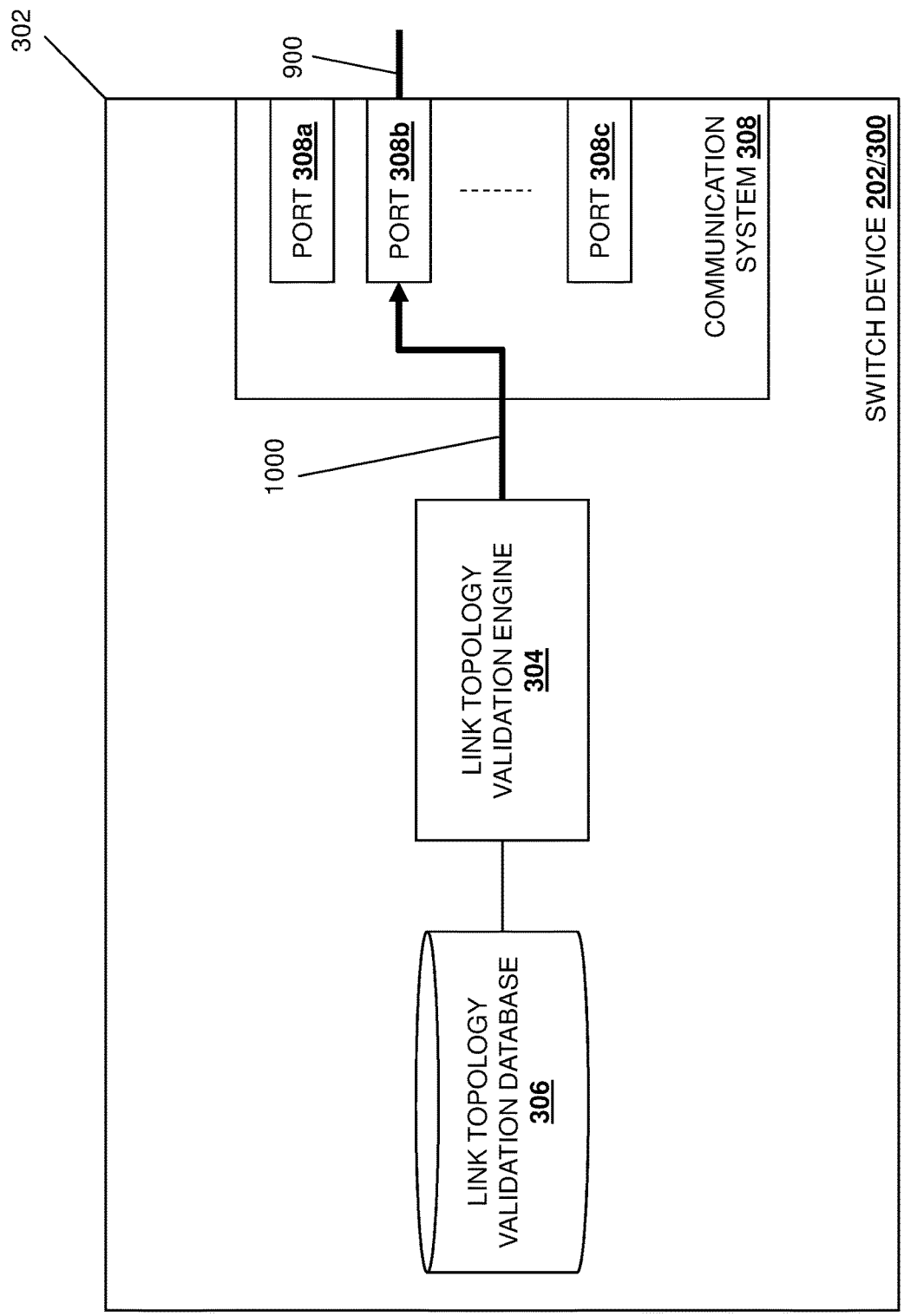
FIG. 10 is an embodiment of the switch device of FIG. 3 operating during the method of FIG. 4.

With reference to FIG. 10, in an embodiment of block 412 and in response to detecting the port connection cycling operation associated with its port 308b, the link topology validation engine 304 in the switch device 202/300 may perform port configuration operations 1000 that include clearing the auto-negotiation error state from the its port 308b. As will be appreciated by one of skill in the art in possession of the present disclosure, the clearing of the auto-negotiation error state from the port 308b on the switch device 202/300 will allow the link 900 to become available (e.g., via the performance of auto-negotiation operations between the switch device 202, the switch device 204a, the port 308b on the switch device 202/300, the port 308a on the switch device 204a, and/or other auto-negotiation subsystems). The method 400 then returns to block 402. As such, the method 400 may loop such that the port 308b on the switch device 202/300 is configured in an auto-negotiation error state until it is connected to a port on the one of the switch devices 204a-204c in a manner that provides a valid link, at which time that valid link may be utilized to transmit data.

Thus, systems and methods have been described that provide for the configuration of a port that provides an invalid link in an auto-negotiation error state that provides that port in an operationally down state that still allows signals to be detected via that port, which further allows a port connection cycling operation associated with that port to clear its auto-negotiation error state such that subsequent link validation operations may again be performed on a link provided via that port without the need to manually reconfigure that port. For example, the link validation system of the present disclosure may include a first device and a second device. The first device identifies that a first link to the second device has become available via a first port on the first device, and determines that the first link to the second device is not a valid link. In response to determining that the first link to the second device is not a valid link, the first device configures the first port in an auto-negotiation error state. Subsequent to configuring the first port in the auto-negotiation error state, the first device detects a port connection cycling operation associated with the first port and, in response, clears the auto-negotiation error state for the first port. As such, the link validation systems and methods of the present disclosure handle invalid links by stopping the flow of data traffic over the link, and allowing link validation operations to be automatically reinitiated when the connection on either end of the link is changed, thus remedying issues associated with conventional link validation systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A link validation system, comprising:
a second device; and
a first device that is configured to:
identify that a first link to the second device has become available via a first port on the first device;
determine that the first link to the second device is not a valid link;
configure, in response to determining that the first link to the second device is not a valid link, the first port in an auto-negotiation error state;
detect, subsequent to configuring the first port in the auto-negotiation error state, a port connection cycling operation associated with the first port; and
clear, in response to detecting the port connection cycling operation associated with the first port, the auto-negotiation error state for the first port.

2. The system of claim 1, wherein the determining that the first link to the second device is not a valid link includes determining that the first link to the second device does not conform to a link topology.

3. The system of claim 1, wherein the first link to the second device is identified as having become available via the first port in response to the first port entering an operationally up state, and wherein the auto-negotiation error state provides the first port in an operationally down state that allows the port connection cycling operation to be detected via the first port.

4. The system of claim 1, wherein the port connection cycling operation associated with the first port includes the disconnection of a cable from the first port followed by a connection of a cable to the first port.

5. The system of claim 1, wherein the port connection cycling operation associated with the first port includes the disconnection of a cable from a second port that is coupled to the first port by the cable, and the connection of the cable to a third port.

6. The system of claim 1, wherein the first device is configured to:
   identify, subsequent to clearing the auto-negotiation state for the first port, that a second link to the second device has become available via the first port on the first device;
   determine that the second link to the second device is a valid link; and
   transmit data via the second link.

7. The system of claim 1, wherein the first device is configured to:
   complete auto-negotiation operations prior to identifying that the first link to the second device has become available via the first port on the first device.

8. An Information Handling System (IHS), comprising:
   a processing system; and
   a memory system that is coupled to the processing system and that includes instructions that, when executed by the processing system, cause the processing system to provide a link validation engine that is configured to:
      identify that a first link to a device has become available via a first port coupled to the processing system;
      determine that the first link to the device is not a valid link;
      configure, in response to determining that the first link to the device is not a valid link, the first port in an auto-negotiation error state;
      detect, subsequent to configuring the first port in the auto-negotiation error state, a port connection cycling operation associated with the first port; and
      clear, in response to detecting the port connection cycling operation associated with the first port, the auto-negotiation error state for the first port.

9. The IHS of claim 8, wherein the determining that the first link to the device is not a valid link includes determining that the first link to the device does not conform to a link topology.

10. The IHS of claim 8, wherein the first link to the device is identified as having become available via the first port in response to the first port entering an operationally up state, and wherein the auto-negotiation error state provides the first port in an operationally down state that allows the port connection cycling operation to be detected via the first port.

11. The IHS of claim 8, wherein the port connection cycling operation associated with the first port includes the disconnection of a cable from the first port followed by a connection of a cable to the first port.

12. The IHS of claim 8, wherein the port connection cycling operation associated with the first port includes the disconnection of a cable from a second port that is coupled to the first port by the cable, and the connection of the cable to a third port.

13. The IHS of claim 8, wherein the link validation engine is configured to:
   identify, subsequent to clearing the auto-negotiation state for the first port, that a second link to the second device has become available via the first port on the first device;
   determine that the second link to the second device is a valid link; and
   transmit data via the second link.

14. A method for validating a link, comprising:
   identifying, by a first device, that a first link to a second device has become available via a first port on the first device;
   determining that the first link to the second device is not a valid link;
   configure, in response to determining that the first link to the second device is not a valid link, the first port in an auto-negotiation error state;
   detecting, subsequent to configuring the first port in the auto-negotiation error state, a port connection cycling operation associated with the first port; and
   clearing, in response to detecting the port connection cycling operation associated with the first port, the auto-negotiation error state for the first port.

15. The method of claim 14, wherein the determining that the first link to the second device is not a valid link includes determining that the first link to the second device does not conform to a link topology.

16. The method of claim 14, wherein the first link to the second device is identified as having become available via the first port in response to the first port entering an operationally up state, and wherein the auto-negotiation error state provides the first port in an operationally down state that allows the port connection cycling operation to be detected via the first port.

17. The method of claim 14, wherein the port connection cycling operation associated with the first port includes the disconnection of a cable from the first port followed by a connection of a cable to the first port.

18. The method of claim 14, wherein the port connection cycling operation associated with the first port includes the disconnection of a cable from a second port that is coupled to the first port by the cable, and the connection of the cable to a third port.

19. The method of claim 14, further comprising:
   identifying, by the first device subsequent to clearing the auto-negotiation state for the first port, that a second link to the second device has become available via the first port on the first device;
   determining, by the first device, that the second link to the second device is a valid link; and
   transmitting, by the first device, data via the second link.

20. The method of claim 14, further comprising:
   completing, by the first device, auto-negotiation operations prior to identifying that the first link to the second device has become available via the first port on the first device.

* * * * *